United States Patent

Leonard et al.

[15] 3,636,472
[45] Jan. 18, 1972

[54] PULSED LASER DEVICE EMPLOYING ELECTRODES WITH PROJECTIONS

[72] Inventors: Donald A. Leonard, Stoneham; Henry W. Smith, Essex, both of Mass.

[73] Assignee: Avco Corporation, Cincinnati, Ohio

[22] Filed: July 10, 1968

[21] Appl. No.: 743,867

[52] U.S. Cl. .................................................331/94.5, 313/351
[51] Int. Cl. ..........................................................H01s 3/00
[58] Field of Search .........................331/94.5; 313/351, 217

[56] References Cited

UNITED STATES PATENTS

| | | | |
|---|---|---|---|
| 2,929,922 | 3/1960 | Schawlow et al. | 331/94.5 |
| 3,149,290 | 9/1964 | Bennett, Jr. et al. | 331/94.5 |
| 3,253,226 | 5/1966 | Herriott et al. | 331/94.5 |
| 3,388,314 | 6/1968 | Gould | 331/94.5 |
| 3,396,301 | 8/1968 | Kobayashi et al. | 331/94.5 |
| 2,697,800 | 12/1954 | Roberts | 313/351 X |
| 2,860,276 | 11/1958 | Grogg, Jr. et al. | 313/351 |
| 3,174,043 | 3/1965 | Dyke et al. | 313/351 UX |
| 3,402,313 | 9/1968 | Gabor et al. | 313/351 X |
| 3,466,485 | 9/1969 | Arthur, Jr. et al. | 313/351 X |

OTHER PUBLICATIONS

Herriott, J.O.S.A., Vol. 52, No. 1, 1/62, pp. 31–37
Chebotayev, Radio Eng. & Elec. Phys., Vol. 10, 2/65, pp. 316–318
Patel, Phys. Rev. Ltrs., Vol. 13, No. 21, 11/64, pp. 617–619

*Primary Examiner*—Ronald L. Wibert
*Assistant Examiner*—Warren A. Sklar
*Attorney*—Charles M. Hogan and Melvin E. Frederick

[57] ABSTRACT

Electrodes for and a stabilized pulsed laser utilizing electrodes for providing a gas discharge created by a pulsed electric field. At least one of the electrodes is made uniformly rough on a scale small compared to both the interelectrode spacing and electrode width as by using freestanding wires to generally define a wire brush arrangement.

8 Claims, 4 Drawing Figures

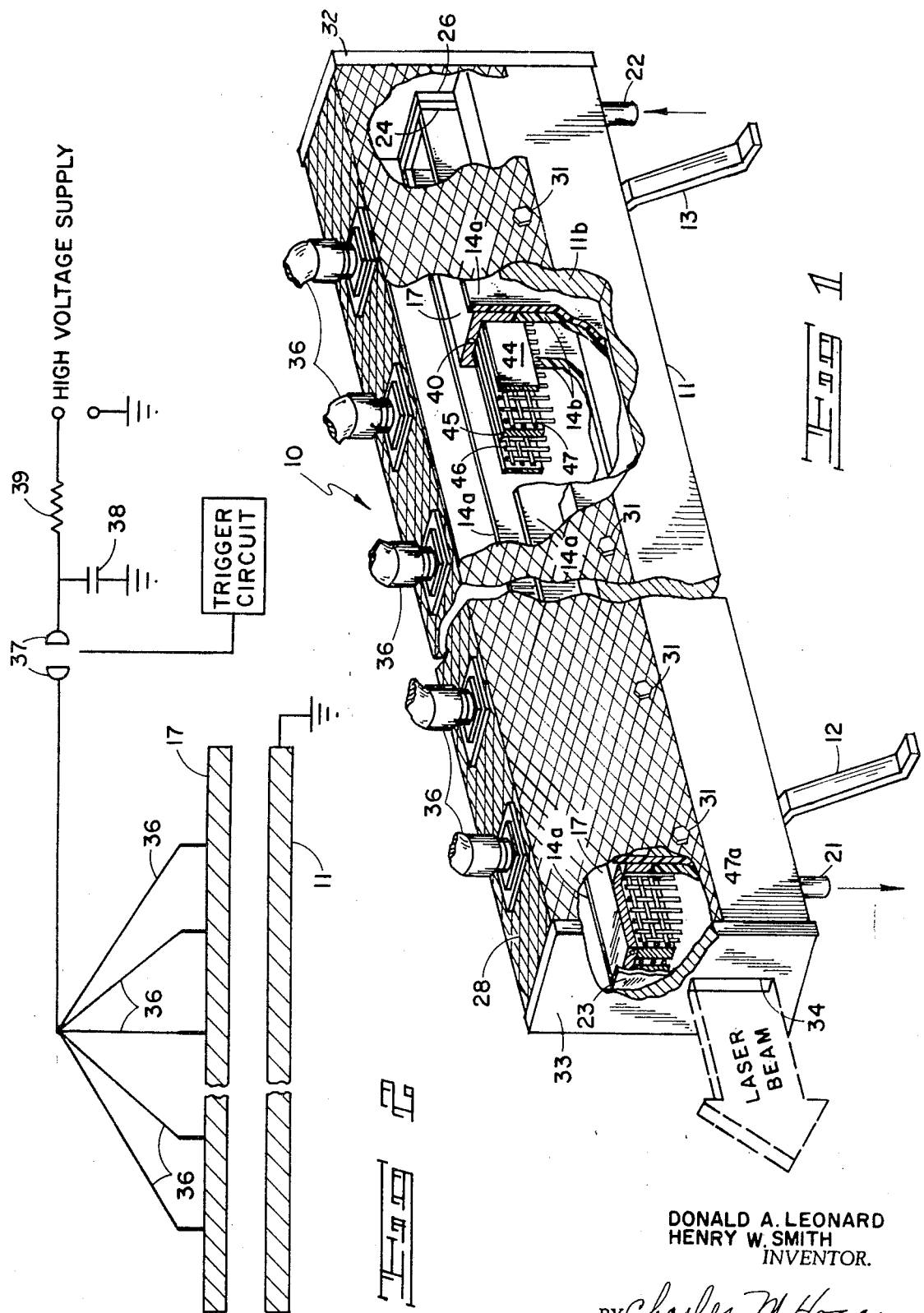

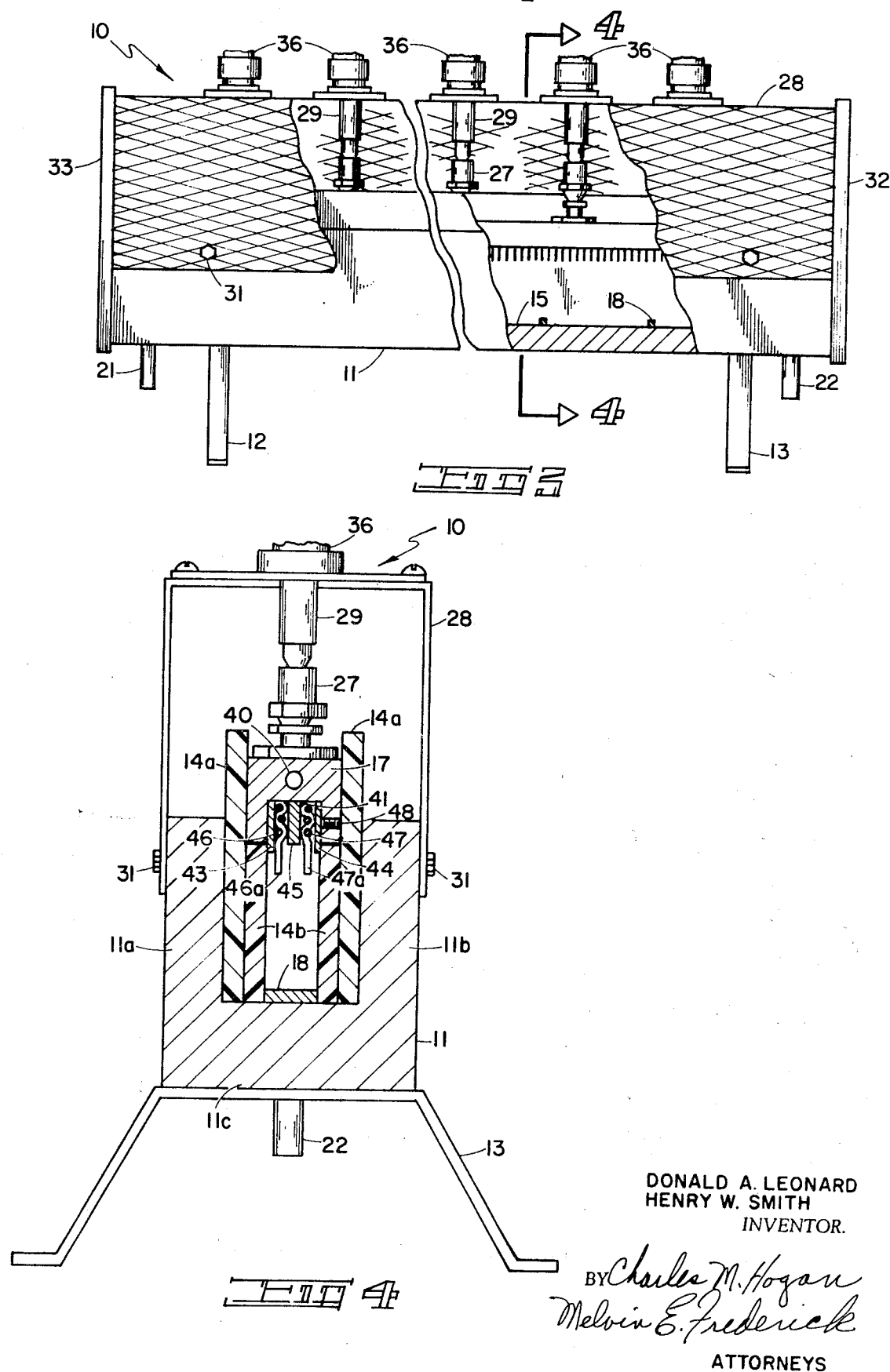

PULSED LASER DEVICE EMPLOYING ELECTRODES WITH PROJECTIONS

This invention relates to pulsed laser devices and more particularly to laser devices which employ electrodes that are uniformly rough on a scale small compared to both the electrode spacing and electrode width.

In the operation of prior art pulsed nitrogen and pulsed neon lasers, an instability in the discharge current distribution leading to a concentration of current in one local region occurs with a disturbing degree of regularity. This concentration of current into an arc spot results in decreased power output and quite often leads to eventual destructive failure of the electrodes and/or dielectric sidewalls of the laser channel.

A crossed-field geometry which has been developed for the pulsed nitrogen and pulsed neon lasers is described in patent application Ser. No. 536,094 filed Mar. 21, 1966, now U.S. Pat. No. 3,553,603 to which reference is made. See also the article entitled "The 5401-A Pulsed Neon Laser" by Donald A. Leonard, published in IEEE Journal of Quantum Electronics, Volume QE-3, Number 3, March 1967, pp. 134–135.

In the aforementioned prior art crossed field type of laser, power flows from a capacitor (see FIG. 2) through low inductance transmission lines to the upper electrode, which typically is a single smooth metal strip running the length of the active region. A U-shaped channel serves both as structural support for the device and as the other electrode. The discharge takes place between dielectric sidewalls. On the short time scales required by these lasers, the initial current distribution is essentially inductance-controlled and, when operating normally and not subject to arc spot or hot spot failure, extremely uniform discharges can be produced along the entire length of the channel.

Arc spot or hot spot failure mode in these prior art lasers may be seen as a bright spot or several bright spots which appear at random positions along the channel. With aluminum channels and aluminum electrodes, upon examination after operation with hot spots, a pronounced pitting and discoloration of the electrodes will be observed. In the development of the present invention, stainless steel, copper and chrome electrodes were tried but were found to show similar effects differing only in detail to some extent. However, in general, these electrodes were subject to the same arc spot or hot spot failure mode. The position of pits on electrodes correlated with the position of the observed hot spots when the laser was operating.

As a result of the above-noted and additional trials to eliminate hot spots, it was found that the onset and behavior of hot spots is a function of gas pressure in the laser, the repetition rate, the average power being dissipated in the laser, the temperature of the channel, and the material and surface condition of the electrodes and the sidewalls. In general, the appearance of hot spots was found to be favored by higher repetition rates, higher average power, and higher operating temperatures. The process of hot spot formation also was found to be somewhat irreversible—once a hot spot appeared, even if the laser was shut off, allowed to cool down and then started again, the hot spot tended to reappear in the same spot. This led to the conclusion that the surface condition of the electrode is important and that pits or rough spots in an otherwise smooth and uniform surface favor the formation of hot spots. The operating pressure was also found to be a significant factor in the onset and behavior of hot spots. The aforementioned nitrogen laser, for example, normally operates at a pressure of 25 torr of nitrogen gas. If this pressure is either raised or lowered by about a factor of 3, i.e., to below 10 torr or to above 75 torr, then hot spots tend to readily appear and, again, if the laser is shut down and restarted at the correct pressure, the hot spots still tend to reappear. Accordingly, in the aforementioned prior art lasers, operation at a wrong pressure setting can thus be a fail-catastrophic condition.

A typical life test for a laser as disclosed in the aforementioned application Ser. No. 536,094, having a 1 meter long aluminum electrode and aluminum channel, both water-cooled, operating at 100 pulses per second, having nominal output of 100 kilowatts peak laser power and a power dissipation of about 200 watts in the channel, is about 40 hours. In such a laser, hot spots generally develop after about 40 hours of operation with a coincident fall-off in power. By way of example, in one particular test a hot spot that occurred at about the 38th hour disappeared by the 42nd hour but was replaced at the 52nd hour by a hot spot that got progressively worse from that point on while the test continued.

Before development of an improved laser in accordance with the present invention, which improved laser is substantially immune to hot spot failure, various other attempts were made to prevent the formation of hot spots. For example, channels and electrodes were first water-cooled and this obvious measure extended the time to failure by hot spots by perhaps a factor of 2. Also, care was taken with the surface finish of the electrodes to obtain as smooth a surface as possible. However, this did not seem to influence performance significantly, as pits and imperfections occurred regardless of surface finish. Various materials were tried—notably chrome-plating of the electrodes and the use of quartz, dielectric walls. Chrome was chosen because of its hardness and low vapor pressure. The performance of the chrome-plate-quartz-walled combination was unexpectedly poor with hot spots developing within a few hours. Apparently a regenerative process developed whereby a hot spot once started was able to increase in intensity and thereby reach a very high temperature because of the high temperature capability of chrome and quartz. In channels containing the aforementioned chrome and quartz, the hot spot position correlated with the position of deep pit marks in the chrome.

In accordance with the present invention, hot spot failure is substantially eliminated by making at least the upper electrode uniformly rough on a scale small compared to both the interelectrode spacing and the electrode width so that currents originating from adjacent rough points will diffuse and merge together and therefore produce a uniform current distribution in the body of the discharge channel. The scale, character and spacing of the rough points should, however, be larger than, and not perturbed or distorted by imperfections or temporary arc spots or pitting that may from time to time occur under discharge conditions. Achievement of this effectively stabilizes the current distribution and insures that small local current concentrations that may occur from time to time do not produce significant local pits or hot spots on the electrodes which in turn cause a current concentration at that spot. By producing in accordance with the invention an electrode with essentially as many as hundreds of uniformly distributed imperfections per inch, a laser incorporating such an electrode is stable with respect to the formation of new and undesirable imperfections from other uncontrolled causes. A smooth prior art electrode on the other hand is sensitive to imperfections, since an imperfection on a smooth surface is a unique point.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

FIG. 1 is a perspective view of an embodiment of the invention taken partially in section showing portions of the invention in detail;

FIG. 2 is a schematic view showing the electric circuit employed in the device of FIG. 1;

FIG. 3 is a side-elevational view partially in section showing the device of FIG. 1 having portions of the structure omitted; and FIG. 4 is a sectional view taken along lines 4—4 of FIG. 3 showing elements of the invention in detail.

Referring to the drawings, especially FIG. 1, there is shown a laser device generally designated by the numeral 10 and having a base 11 mounted on a pair of supports 12 and 13. The base 11 is a U-shaped channel member (see FIG. 4) fabricated from any suitable conductive material, such as aluminum.

The base member 11, having two-leg portions 11a—11b and a bight portion 11c interconnecting the legs as shown in FIG. 4, serves both as a structural member as is evident from FIG. 1 and an electrode as schematically depicted in the circuit shown in FIG. 2.

Referring now back to FIG. 1 taken in conjunction with FIGS. 3 and 4, the laser device 10 is further comprised of a pair of sidewalls 14a—14b and 16a—16b fabricated of a suitable insulating material such as quartz or Pyrex glass. The outermost sidewall members 14a and 16a have a relatively thin upwardly extending flange. Each sidewall is comprised of an outer member and an inner member to facilitate and simplify fabrication and is disposed in the base 11 with the respective stepped surfaces oppositely facing each other as is best shown in FIG. 4. An electrode member 17 (more fully described hereinafter) is supported by the sidewalls and disposed between the aforementioned upwardly extending flanges of sidewall members 14a and 16a, resting on the top surface of members 14b and 16b. In addition to being supported in interfitting engagement between the sidewalls, the electrode member 17 serves to maintain the sidewalls in spaced relation and the flanges of members 14a and 16a prevent arcing between electrode member 17 and base member 11. A plurality of spacers 18 may be disposed adjacent the bottom surface 15 of the base 11 to maintain the lower portions of the sidewalls spaced one from another. The space thus provided between the sidewalls defines a relatively thin elongated duct 19 extending from adjacent one end of the laser device 10 to the other end thereof.

A pair of gas-feeder tubes 21 and 22 are located on the bottom surface of the base 11 and provide passages through the lower portion of the base 11, opening into the cavity 19.

Referring specifically to FIG. 1, there is shown a pair of panels 23 and 24, one disposed adjacent each end of the sidewalls and serving to seal the ends of the cavity 19. The panels 23 and 24 are transparent to light at the wavelength of radiation produced in the cavity 19 and thus serve as windows for the laser beam emanating from the cavity. The panels 23 and 24 may be fabricated from quartz or other well-known material having the desired properties as stated.

It should here be noted that the cavity 19 is generally maintained at a pressure other than atmospheric such as, for example, about 25 torr, during the operation of the laser device 10. As is obvious, therefore, it is necessary to pressure-seal the means defining the cavity 19. The various contacting surfaces between the sidewalls and the base 11, the electrode member 17, and the panels 23 and 24 are therefore sealed by a suitable cement or sealant material to provide at least a relatively gastight enclosure in the cavity 19.

Referring still to FIG. 1, adjacent the translucent panel 24 there is disposed a mirror 26 having its reflective surface in contact with the panel 24. The mirror 26 may be a first surface-silvered mirror and may be cemented to the panel 24 along its edges or held in place by any other suitable means leaving the reflective surface unobstructed. Alternatively, panel 24 may comprise the mirror.

The electrode member 17 is provided with a plurality of jack receptacles 27 which are equally spaced along the length of the member. A cover member 28 fabricated of open metal grill work or other suitable conductive material is provided with a plurality of jacks 29 spaced for engagement with the jack receptacles 27 when the cover is positioned on the base 11. The cover member 28 may be removably attached to the base 11 as by bolts 31.

With the cover 28 in place, the end plate 32 is attached adjacent the closed end of the laser device 10 and a port plate 33 is fastened to the open end of the laser device.

The port plate 33 has provided therein an elongated opening 34 in alignment with the cavity 19 and substantially equal in area to the cross section of the cavity.

In FIG. 2 there is schematically shown means for applying a pulsed electric field across the cavity 19.

Referring now to that FIG. 2, taken in connection with FIG. 1, it will be noted that each of the jacks 29 are connected through the cover member 28 to a plurality of coaxial cables 36. The cables 36 may be connected through a triggered spark gap 37 or thyratron to a capacitor means 38, generally a capacitor bank. The energy for the capacitor means 38 is provided by a high-voltage supply which is placed in series with a current-limiting resistor 39. The coaxial cables 36 are grounded to the cover member 28 and serve to complete the circuit through the cover member and the base 11 to the gas in the cavity 19.

The spark gap 37 is triggered by a pulse circuit which may be a commercially available device well known in the art. With the device shown, the circuit parameters are typically $L=0.02$ microhenries, $C=0.03$ microfarads, with an initial capacitor voltage of 15 to 25 kilovolts.

Returning now to the electrode member 17, it is provided along its length with a passage 40 for receiving a coolant such as water. The electrode member 17 is also provided along its length with a recess 41 in its lower surface in register with cavity 19. Disposed within recess 41 are outer spacer members 43 and 44, a center spacer member 45, a screen member 46 disposed between and separating spacers 43 and 45, and a screen member 47 disposed between and separating spacers 44 and 45. The outer spacers 43 and 44 extend slightly below the lower surface of electrode member 17 to present shoulders to the inner sidewall members 14b and 16b and thereby function as spacers to not only maintain the screen member away from the sidewalls a short distance, but to also maintain the aforementioned inner sidewall members in spaced relationship. Setscrews 48 spaced along the length of electrode member 17 are provided to engage one of the outer spacer members and thereby securely lock the spacers and screen members in the electrode member 17. If desired, to improve heat transfer from the screen members, they may be soldered into groove 41. Relatively closely spaced and elongated projections 46a and 47a, such as for example freestanding wires or wirelike projection, extend past the surface of the electrode member 17 and into cavity 19. The mean distance between the extreme ends of these projections and surface 50 of base 11 define the electrode-spacing. While the length of the projections intermediate the ends of cavity 19 are preferably the same length, those immediately adjacent the ends of cavity 19 should gradually decrease in length to prevent high electric field concentrations at these locations. Satisfactory projections providing continuous operation in excess of 200 hours have been fabricated from No. 32 gauge, 30×30 stainless steel wire screen with six strands of horizontal wire removed to provide projections approximately one-eighth inch in length.

While for reasons of convenience, economy and heat transfer, the screen members may be fabricated from stainless steel screening and the like, the invention is not so limited. The operational surface of electrode 17 (and surface 50 if desired) exposed to cavity 19 however provided, need only be uniformly rough on a scale, small compared to both the effective interelectrode spacing and electrode width, so that currents originating from adjacent rough points or projections will diffuse and merge together and thereby produce a uniform current distribution in the body of the discharge channel or cavity 19, the scale and character of the roughness or projections being such that they are not substantially perturbed or distorted by imperfections, heating and/or temporary arc spots or pitting that may from time to time occur under discharge conditions. The preceding provides stabilization of the current distribution in the discharge channel and insures that small local current concentrations that may occur from time to time do not produce significant local pits or hot spots on the electrodes which in turn causes a current concentration at that spot.

Tests of a laser in accordance with the invention incorporating "wire brush electrodes" as generally described hereinabove has indicated that broadly the dimensions of each projection should preferably be such that the spacing between adjacent projections is approximately equal to about one-third the length of the projections in the direction of the electrode spacing and approximately one-third the width of the electrodes, i.e., the width of cavity 19.

In one group of tests, wire brush electrodes were provided at the top and bottom of cavity 19. In one case, six strips of No. 30 gauge, 50×50 stainless steel wire screen was provided in each electrode and in a second case only two strips of the same wire screen material were provided in each electrode. In both cases, the projections which in these instances comprised freestanding wires were about one-eighth inch long. In the case of the electrodes with six strips, development of severe hot spots required discontinuance of the test. Upon disassembly of the channel, it was found that several wires has become welded together. Accordingly, too great a number of projections is likely to render separation of individual projections essentially impossible and thus tends to actually provide many potential points for hot spots. The results of tests with the top and bottom electrodes with just two strips indicated that in this case accurate spacing of the oppositely disposed freestanding wires is important. Further, the use of projections of a size, magnitude and spacing of that of No. 30 gauge, 50× 50 wire screen is not recommended since freestanding wires of this size are prone to become easily twisted and tangled before and after insertion into the discharge channel.

An embodiment substantially as shown and described herein utilizing No 32 gauge, 30×30 stainless steel wire screen with only the base 11 water-cooled operated continuously for over 200 hours with a peak output power of about 130–140 kilowatts at 100 pulses per second. While in tests on this embodiment one hot spot appeared and disappeared in the same place at infrequent intervals, the appearance of this localized hot spot is believed to have been due to the twisting or contact of two or more wires at this point. In further tests of a similar electrode arrangement, operation in excess of 100 hours showed no development of hot spots or other failure mechanism in the laser channel or cavity 19. The laser operated at 100 pulses per second with an output of 100 kilowatts peak power and a dissipation of about 200 watts in the cavity. This operation without any adverse effects is, by way of comparison, a factor of 2½ times the 40 hours of stable operation that can be expected with prior art lasers and electrodes as disclosed, for example, in the aforementioned patent application Ser. No. 536,094. Reference is made to this patent application for a more complete description and a discussion of the operation of lasers of the type here concerned and described.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims:

1. In a laser device for producing pulses of light at high-energy levels comprising means defining an elongated cavity with height and width dimensions having a longitudinal axis; means for supplying to said cavity a gas having at least two energy levels above the ground energy level in which the net excitation rate for the higher of the two upper levels is greater than the net excitation rate for the lower of the two energy levels during electric discharge in said gas; and pulse circuit means for connection to a pulsed source of high-voltage electrical power, said pulse circuit means including first and second opposed electrode members communicating with said cavity and disposed on opposite sides of said cavity and extending parallel to the longitudinal axis, said pulse circuit means providing said discharge at a plurality of different points along the length of said first electrode member whereby said discharge is substantially uniformly distributed along the length of said longitudinal axis and across said cavity normal to said longitudinal axis within the radiative lifetime of said higher state, said pulse circuit means having an inductance whereby a significant fraction of the current in said discharge is delivered within the length of the laser pulse duration, the improvement comprising:

a. a plurality of electrically conductive projections extending into said cavity from said first electrode member and toward said second electrode member, said projections extending along the length of said cavity and defining a plurality of end surfaces spaced one from another a distance that is small compared to the length of said cavity, said end surfaces being small compared to both said width and height dimensions of said cavity.

2. The improvement as defined in claim 1 wherein said projections extend into said cavity normal to said longitudinal axis and currents originating from said projections produce a substantially uniform current distribution along said longitudinal axis.

3. The improvement as defined in claim 2 wherein the spacing of said projections and their cross section is small compared to the spacing of said first and second electrode members whereby said uniform current distribution is substantially unaffected by local current concentrations at said projections.

4. The improvement as defined in claim 1 wherein said projections are of a wirelike configuration.

5. The improvement as defined in claim 4 wherein said projections define first and second rows of consecutive projections extending from said first electrode member toward said second electrode member substantially the length of said cavity and disposed, respectively, adjacent opposite sides of said cavity which are proximate to said first electrode.

6. The improvement as defined in claim 1 wherein the spacing between adjacent projections is about one-third the length of said projections and about one-third the width dimension of said cavity.

7. The improvement as defined in claim 6 wherein said cavity has ends and said projections intermediate said ends of said cavity are all the same length and said projections adjacent said ends of said cavity respectively decrease in length in the direction of said ends.

8. The improvement as defined in claim 6 wherein said first electrode member has a groove coextensive with said cavity, said projections defining said first and second rows comprising respectively freestanding wires forming part of first and second strips of wire screen; and additionally including:

a. first and second outer electrically conductive spacer means and electrically conductive middle spacer means, first and second strips of wire screen being interposed between respectively an outer spacer and the middle spacer; and means for maintaining said spacers and strips in said groove.

* * * * *